US011167961B2

(12) United States Patent
Crawford

(10) Patent No.: US 11,167,961 B2
(45) Date of Patent: Nov. 9, 2021

(54) APPARATUS AND METHOD FOR ASSISTING DEPLOYMENT OF COILED TUBING

(71) Applicant: Oceaneering International, Inc., Houston, TX (US)

(72) Inventor: Neil Crawford, The Woodlands, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/953,627

(22) Filed: Nov. 20, 2020

(65) Prior Publication Data

US 2021/0155461 A1 May 27, 2021

Related U.S. Application Data

(60) Provisional application No. 62/938,702, filed on Nov. 21, 2019.

(51) Int. Cl.
| *E21B 19/08* | (2006.01) |
| *B66C 23/60* | (2006.01) |
| *F16L 1/20* | (2006.01) |
| *B63B 35/03* | (2006.01) |

(52) U.S. Cl.
CPC ............ *B66C 23/605* (2013.01); *B63B 35/03* (2013.01); *E21B 19/08* (2013.01); *F16L 1/203* (2013.01)

(58) Field of Classification Search
CPC ........ B66C 23/605; B63B 35/03; F16L 1/203; E02B 17/02; H02G 1/10
See application file for complete search history.

(56) References Cited

U.S. PATENT DOCUMENTS

| 4,072,123 A | * | 2/1978 | Byers | ...................... B63G 8/42 114/254 |
| 5,738,173 A | * | 4/1998 | Burge | .................... B65H 75/22 166/385 |
| 7,226,244 B1 | * | 6/2007 | De Groot | .................. F16L 1/19 405/166 |

(Continued)

FOREIGN PATENT DOCUMENTS

| GB | 2412130 | * | 9/2005 | ........... E21B 17/085 |
| WO | WO-2020173690 A1 | * | 9/2020 | ........... B62D 29/004 |

*Primary Examiner* — Carib A Oquendo
(74) *Attorney, Agent, or Firm* — Maze IP Law, P.C.

(57) ABSTRACT

Deployment of coiled tubing may be assisted using an apparatus comprising a source of coiled tubing, a coiled tubing distributor that comprises a passageway adapted to allow engaging the coiled tubing from the source of coiled tubing where the passageway comprises a coiled tubing receiver comprising a predetermined radius and a support frame, connected to the passageway, that is adapted to accept a portion of the coiled tubing therethrough, and a slip disposed intermediate the passageway and the support frame where the slip is adapted to accept a portion of the coiled tubing therethrough. The apparatus may be mounted to a structure and a portion of the coiled tubing deployed from the source of coiled tubing about the coiled tubing receiver through the slip. The apparatus is allowed to compensate for motion of the structure while the portion of the coiled tubing is deployed about the coiled tubing receiver through the slip.

16 Claims, 1 Drawing Sheet

(56) References Cited

U.S. PATENT DOCUMENTS

| | | | |
|---|---|---|---|
| 2003/0044235 A1* | 3/2003 | Stockstill | F16L 1/207 405/154.1 |
| 2009/0255683 A1* | 10/2009 | Mouton | E21B 41/0014 166/355 |
| 2014/0241809 A1* | 8/2014 | Millheim | F16L 1/203 405/166 |
| 2015/0184480 A1* | 7/2015 | Welsh | E21B 33/0422 166/382 |
| 2017/0260817 A1* | 9/2017 | Dobkins | E21B 44/02 |
| 2018/0216413 A1* | 8/2018 | Fossheim | E21B 15/00 |
| 2019/0330934 A1* | 10/2019 | Wright | E21B 19/006 |

\* cited by examiner

APPARATUS AND METHOD FOR ASSISTING DEPLOYMENT OF COILED TUBING

RELATION TO OTHER APPLICATIONS

This application claims priority through U.S. Provisional Application 62/938,702 filed on Nov. 21, 2019.

BACKGROUND

Coiled tubing is used as a work string in carrying out various operations in certain wellbores. As commonly used in the art, the term "coiled-tubing" or "reeled tubing" refers to a long, continuous length of a relatively small-diameter, thin-walled steel tubing which is wound onto and off of a large-diameter reel.

Coiled tubing is deployed through the vessel moonpool, or over-the-side from an over-boarding sheave where tubing rolls on and off the sheave due to vessel roll, pitch and heave at high tensions causing low-cycle bending stresses which can prematurely wear out the tubing. Also, the tubing is required to be periodically raised or lowered to subject a new area to the bending cycles which are then recorded to manage the life of the coiled tubing.

FIGURES

Various figures are included herein which illustrate aspects of embodiments of the disclosed inventions.

Figure 1:
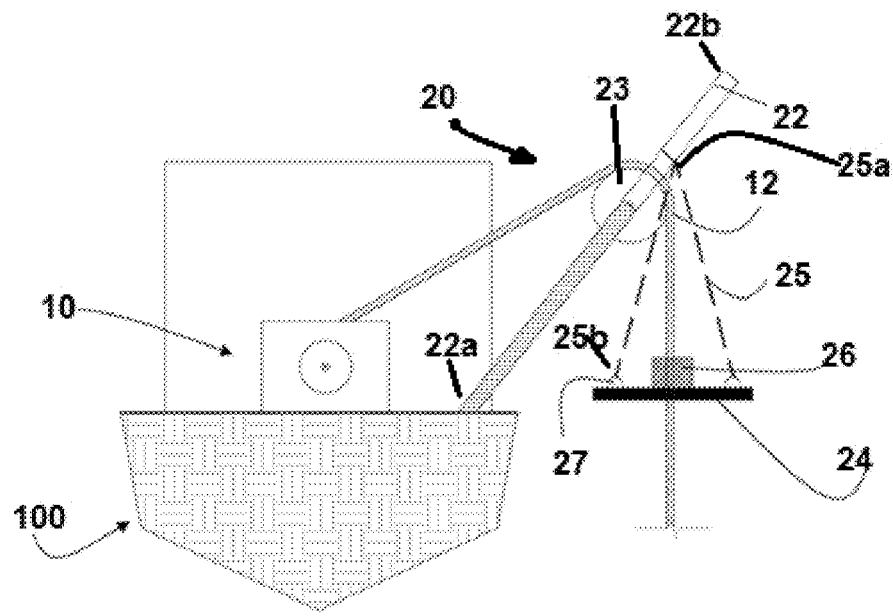
Figure 2:
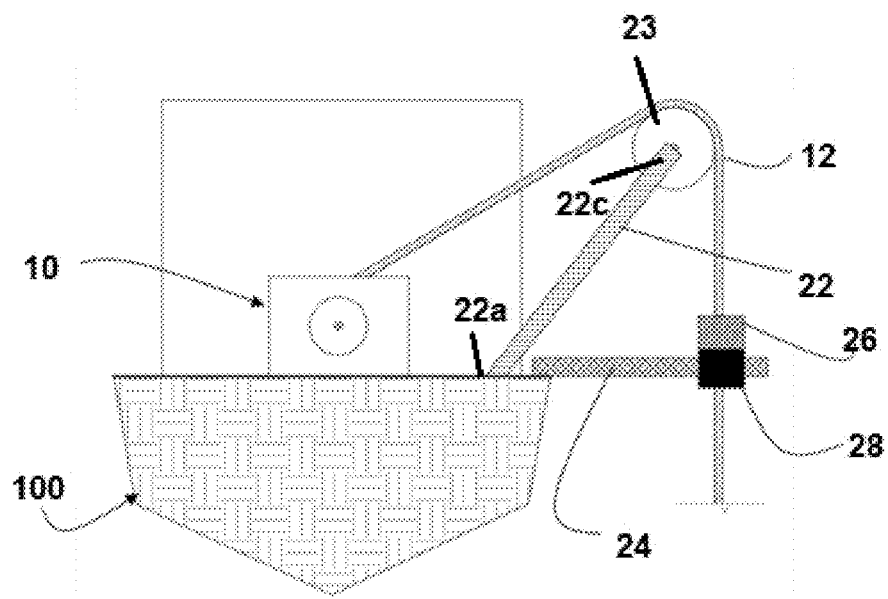

FIG. 1 is a view in partial perspective of a first exemplary embodiment of apparatus 1; and FIG. 2 is a view in partial perspective of a second exemplary embodiment of apparatus 1.

DESCRIPTION OF EXEMPLARY EMBODIMENTS

In a first embodiment, referring generally to FIG. 1, apparatus 1, which is usable for assisting deployment of coiled tubing, comprises source 10 of coiled tubing 12 and coiled tubing distributor 20.

In embodiments, coiled tubing distributor 20 comprises passageway 22 adapted to engage coiled tubing 12, where passageway 22 comprises coiled tubing receiver 23, which comprises a predetermined radius, adapted to receive coiled tubing 12 about an outer surface of coiled tubing receiver 23; support frame 24 connected to passageway 22 where support frame 24 is adapted to accept a portion of coiled tubing 12 therethrough; and slip 26 disposed about a portion of support frame 24 and adapted to accept a portion of coiled tubing 12 therethrough.

In an embodiment, passageway 22, which may comprise or otherwise define an A-frame, comprises first end 22a configured to be attached to a structure such as vessel 100 and second end 22b. In this embodiment, coiled tubing receiver 23 is typically connected to a predetermined portion of second end 22b which may extend beyond coiled tubing receiver 23 away from first end 22a, e.g. upward from a deck of vessel 100. In this embodiment, support frame 24 may be attached to a predetermined portion of passageway 22 at a hinge.

Further, support 25 may be present and hingedly connected to passageway 22 at first end 25a of support 25 and connected to support frame 24 at second end 25b of support 25. In an embodiment, support 25 may comprise a flexible support such as a rope or a chain or a rigid support and may further be is connected to support frame 24 at padeye 27 connected to support frame 24 and to second end 25b of support 25. In one or more embodiments, support 25 may comprise a plurality of supports 25, each hingedly connected to passageway 22 at first end 25a of each such support 25 and connected to support frame 24 at second end 25b of each such support 25.

In a further embodiment, referring now to FIG. 2, passageway 22 comprises first end 22a, configured to be attached to a structure such as vessel 100, and second end 22c, where coiled tubing receiver 23 is typically connected to or proximate to second end 22c. In this embodiment, support frame 24 is typically substantially fixed to the structure and apparatus 1 further comprises gimbal 28 connected to support frame 24 and to slip 26 intermediate slip 26 and support frame 24. Gimbal 28 is typically pivotally connected to slip 26 and configured to allow rotation of an object about a single axis, e.g. coiled tubing 12. In this embodiment, support frame 24, gimbal 28, and slip 26 are typically supported on an active and/or passive heave system.

Further, slip 26 comprises a non-damaging, self-aligning slip which is relevant as coiled tubing 12 may be used for pumping lines and be coated externally to protect coiled tubing 12 from sea water corrosion. However, even if a non-coated corrosion resistant metal is used for coded tubing 12, typical slips would mechanically damage the surface of coiled tubing 12 which dramatically reduces the low and high cycle fatigue life of coiled tubing 12.

In the operation of exemplary methods, apparatus 1 may be used to reduce an impact of bending stress on coiled tubing "slips" which are typically included in a tube management assembly. Existing solutions have high bending stresses that leads to prematurely wearing out of the tubing. In order to reduce bending stresses of coiled tubing 12 while vessel 100 is in in motion roll, pitch, and/or heave, in its embodiments slips 26 or slip units may be included in a tube management assembly and grip and hold coiled tubing 12 and prevent cycling back and forth over a sheave on coiled tubing 12.

Referring back to FIG. 1, deployment of coiled tubing 12 may be assisted using apparatus 1 as described above. Typically, apparatus 1 is mounted to a structure such as vessel 100; a portion of coiled tubing 12 deployed from source 10 of coiled tubing 12 about coiled tubing receiver 23, such as through slip 26; and apparatus 1 allowed to compensate for motion of the structure while the portion of coiled tubing 12 is deployed about coiled tubing receiver 23, such as through slip 26.

In embodiments where passageway 22 comprises first end 22a configured to be attached to the structure and second end 22b, coiled tubing receiver 23 is connected to a predetermined portion of second end 22b which extends beyond coiled tubing receiver 23 away from first end 22a. In this embodiment, support frame 24 is typically hingedly attached to a predetermined portion of passageway 22 and compensation for motion of the structure while the portion of coiled tubing 12 is deployed about coiled tubing receiver 23 through slip 26 may be achieved by allowing support frame 24 to pivot at the point at which it is hingedly attached to the predetermined portion of passageway 22 as the structure moves.

Referring now to FIG. 2, in embodiments where passageway 22 comprises first end 22a configured to be attached to the structure and second end 22c such that coiled tubing receiver 23 is connected to or proximate to a predetermined portion of second end 22c, support frame 24 is substantially fixed to the structure and apparatus 1 further comprises gimbal 28 connected to support frame 22 and to slip 26. In this embodiment, compensation for motion of the structure while the portion of coiled tubing 12 is deployed about coiled tubing receiver 23 through slip 26 may be achieved by allowing slip 26 to remain substantially vertical as the structure moves. If the structure comprises vessel 100, gimbal 28 may further enable slip 26 to remain substantially vertical while vessel 100 rolls, pitches, and/or yaws.

Although the discussion above generally relates to the field of coiled tubing and coiled tubing applications in hydrocarbon wells and relates to reducing bending and fatigue of coiled tubing, apparatus 1 and its methods of use are not limited to hydrocarbon wells and can be equally applicable to non-hydrocarbon wells and/or subsea interventions such as by coiled tubing 12 into, e.g., a pipeline.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. An apparatus for assisting deployment of coiled tubing, comprising:
   a. a source of coiled tubing; and
   b. a coiled tubing distributor, comprising:
      i. a passageway adapted to engage coiled tubing, the passageway comprising:
         a. a first end configured to be attached to a structure external to the coiled tubing distributor; and
         b. a second end disposed distally from the first end;
      ii. a coiled tubing receiver connected to a predetermined portion of the second end and adapted to receive coiled tubing from the source of coiled tubing about an outer surface of the coiled tubing receiver, the coiled tubing receiver comprising a predetermined radius;
      iii. a support frame connected to the passageway, the support frame adapted to accept a portion of coiled tubing therethrough; and
      iv. a slip disposed about a portion of the support frame and adapted to grip and hold a portion of coiled tubing therethrough; and
      v. a gimbal connected to the support frame and to the slip intermediate the slip and the support frame.

2. The apparatus for assisting deployment of coiled tubing of claim 1, wherein, the second end extends beyond the coiled tubing receiver away from the first end.

3. The apparatus for assisting deployment of coiled tubing of claim 1, wherein the support frame is hingedly attached to a predetermined portion of the passageway.

4. The apparatus for assisting deployment of coiled tubing of claim 3, further comprising a support hingedly connected to the passageway at a first end of the support and connected to the support frame at a second end of the support.

5. The apparatus for assisting deployment of coiled tubing of claim 3, wherein the support comprises a plurality of supports, each hingedly connected to the passageway at a first end of each such the support and connected to the support frame at a second end of each such the support.

6. The apparatus for assisting deployment of coiled tubing of claim 5, wherein the support is connected to the support frame at a padeye connected to the support frame and to the second end of the support.

7. The apparatus for assisting deployment of coiled tubing of claim 3, wherein the support comprises a rope or a chain.

8. The apparatus for assisting deployment of coiled tubing of claim 1, wherein the passageway comprises an A-frame.

9. The apparatus for assisting deployment of coiled tubing of claim 1, wherein:
   a. the support frame is substantially fixed to the structure; and
   b. the apparatus further comprises a gimbal connected to the support frame and to the slip intermediate the slip and the support frame.

10. The apparatus for assisting deployment of coiled tubing of claim 9, wherein the gimbal is pivotally connected to the slip and configured to allow rotation of an object about a single axis.

11. The apparatus for assisting deployment of coiled tubing of claim 9, wherein the support frame, gimbal, and slip are supported on an active and/or passive heave system.

12. The apparatus for assisting deployment of coiled tubing of claim 1, wherein the slip comprises a non-damaging, self-aligning slip.

13. A method for assisting deployment of coiled tubing using an apparatus for assisting deployment of coiled tubing, comprising a source of coiled tubing and a coiled tubing distributor that comprises a passageway adapted to allow engaging coiled tubing from the source of coiled tubing where the passageway comprises a first end configured to be attached to an structure external to the coiled tubing distributor and a second end disposed distally from the first end, a coiled tubing receiver connected to a predetermined portion of to the second end and adapted to receive the coiled tubing from the source of coiled tubing about an outer surface of the coiled tubing receiver where the coiled tubing receiver comprises a predetermined radius, a support frame connected to the passageway and adapted to accept a portion of the coiled tubing therethrough, a slip disposed intermediate the passageway and the support frame where the slip is adapted to grip and hold a portion of the coiled tubing therethrough, and a gimbal connected to the support frame and to the slip intermediate the slip and the support frame, the method comprising:
   a. mounting the apparatus for assisting deployment of coiled tubing to the structure external to the coiled tubing distributor;
   b. deploying a portion of the coiled tubing from the source of coiled tubing about the coiled tubing receiver through the slip; and
   c. allowing the apparatus for assisting deployment of coiled tubing to compensate for motion of the structure while the portion of the coiled tubing is deployed about the coiled tubing receiver through the slip.

14. The method of claim 13, wherein
   a. the second end extends beyond the coiled tubing receiver away from the first end;
   b. the support frame is hingedly attached to a predetermined portion of the passageway; and
   c. compensation for motion of the structure while the portion of the coiled tubing is deployed about the coiled tubing receiver through the slip is achieved by allowing the support frame to pivot at the point at which it is hingedly attached to the predetermined portion of the passageway as the structure moves.

15. The method of claim 13, wherein:
   a. the support frame is substantially fixed to the structure; and
   b. compensation for motion of the structure while the portion of the coiled tubing is deployed about the coiled tubing receiver through the slip is achieved by allowing the slip to remain vertical as the structure moves.

16. The method of claim 15, wherein the structure comprises a vessel and the gimbal enables the slip to remain vertical while the vessel rolls, pitches, and/or yaws.

\* \* \* \* \*